United States Patent
Tschudin

(10) Patent No.: US 11,326,916 B2
(45) Date of Patent: May 10, 2022

(54) METHOD FOR PRODUCING A MAGNETIC INDUCTIVE FLOWMETER, AND MAGNETIC INDUCTIVE FLOWMETER

(71) Applicant: Endress+Hauser Flowtec AG, Reinach (CH)

(72) Inventor: Beat Tschudin, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 160 days.

(21) Appl. No.: 16/628,824

(22) PCT Filed: Jun. 19, 2018

(86) PCT No.: PCT/EP2018/066260
§ 371 (c)(1),
(2) Date: Jan. 6, 2020

(87) PCT Pub. No.: WO2019/007673
PCT Pub. Date: Jan. 10, 2019

(65) Prior Publication Data
US 2020/0182666 A1    Jun. 11, 2020

(30) Foreign Application Priority Data

Jul. 6, 2017    (DE) ..................... 10 2017 115 156.7

(51) Int. Cl.
*G01F 1/58*    (2006.01)
(52) U.S. Cl.
CPC .............. *G01F 1/584* (2013.01); *G01F 1/586* (2013.01)

(58) Field of Classification Search
CPC ........... G01F 1/584; G01F 1/586; G01F 1/588
See application file for complete search history.

(56) References Cited

U.S. PATENT DOCUMENTS

| 4,774,844 A | 10/1988 | Davis |
| 2002/0125974 A1* | 9/2002 | Cage ....................... H01F 7/081 |
| | | 335/220 |

(Continued)

FOREIGN PATENT DOCUMENTS

| CN | 1973187 A | 5/2007 |
| CN | 101592506 A | 12/2009 |

(Continued)

*Primary Examiner* — Peter J Macchiarolo
*Assistant Examiner* — John M Royston
(74) *Attorney, Agent, or Firm* — Christopher R. Powers; Endress+Hauser Holding Inc.

(57) ABSTRACT

The present disclosure relates to a method for producing a coil holder of a magnetic inductive flowmeter by injection molding, wherein the coil holder has two coil cores cast in a plastic casting, which two coil cores each have a first longitudinal axis, the method comprising: providing and positioning of a mold with a cast volume and the two coil cores, wherein each coil core has two end faces and a lateral surface, wherein the lateral surface has a central region and two outer regions bounding the central region, wherein the cast volume completely bounds the central regions in a coil region, wherein the outer regions and the end faces are outside of the cast volume; filling the cast volume with a plastic; allowing the plastic to harden; and removing the mold from the plastic casting, wherein the cast volume is continuous.

18 Claims, 6 Drawing Sheets

(56) References Cited

U.S. PATENT DOCUMENTS

| | | | | |
|---|---|---|---|---|
| 2006/0213284 A1* | 9/2006 | Visser | ............... | G01F 1/58 |
| | | | | 73/861.12 |
| 2010/0024569 A1* | 2/2010 | Ehrenberg | ............. | G01F 1/586 |
| | | | | 73/861.12 |
| 2014/0157910 A1* | 6/2014 | Voigt | ............. | G01F 1/586 |
| | | | | 73/861.11 |
| 2015/0168188 A1* | 6/2015 | Reichart | ............. | G01F 1/588 |
| | | | | 73/861.12 |
| 2018/0136024 A1* | 5/2018 | Sonnenberg | ............. | G01F 15/00 |

FOREIGN PATENT DOCUMENTS

| | | |
|---|---|---|
| CN | 103765469 A | 4/2014 |
| CN | 104034383 A | 9/2014 |
| CN | 106662474 A | 5/2017 |
| DE | 102007004826 A1 | 8/2008 |
| DE | 102011079352 A1 | 1/2013 |
| DE | 102014106567 A1 | 11/2015 |
| DE | 102015119519 A1 | 5/2017 |
| WO | 2007125018 A1 | 11/2007 |

\* cited by examiner

METHOD FOR PRODUCING A MAGNETIC INDUCTIVE FLOWMETER, AND MAGNETIC INDUCTIVE FLOWMETER

CROSS-REFERENCE TO RELATED APPLICATIONS

The present application is related to and claims the priority benefit of German Patent Application No. 10 2017 115 156.7, filed on Jul. 6, 2017, and International Patent Application No. PCT/EP2018/066260, filed on Jun. 19, 2018, the entire contents of which are incorporated herein by reference.

TECHNICAL FIELD

The invention relates to a method for producing a magnetic inductive flowmeter for measuring volume flow, or flow velocity, of a medium flowing through a measuring tube as well as to such a flowmeter.

BACKGROUND

Typical magnetic inductive flowmeters have a measuring tube for conveying a medium, a magnet system for producing a magnetic field, which extends perpendicularly to the measuring tube, and a pair of measuring electrodes for registering a flow dependent electrical voltage induced in the medium by the magnetic field. The magnetic inductive measuring principle has been known for a long time for flow measurement uses, wherein corresponding magnetic inductive flowmeters have already undergone a large number of improvements and further developments. Thus, DE102014106567A1 proposes a fast assembly system for fast assembly of two sub-magnet systems of a magnet system on a measuring tube of a magnetic inductive flowmeter. Such, however, has disadvantages as regards precision of the assembly as well as regards the required effort, since the sub-magnet systems must be brought together and held via two bent segments.

SUMMARY

An object of the invention, consequently, is a magnet system, which can be assembled simply and precisely on a measuring tube of a magnetic inductive flowmeter.

The invention is achieved by a method for producing a coil holder of a coil system of a magnetic inductive flowmeter as defined in independent claim 1 as well as by a magnetic inductive flowmeter as defined in independent claim 7.

A method of the invention for producing a coil holder of a coil system of a magnetic inductive flowmeter by means of a casting method with two coil cores cast in a plastic casting, which coil cores have, in each case, first longitudinal axes, includes method steps as follows:

providing and positioning of a mold with a cast volume as well as the two coil cores, wherein each coil core has two end faces as well as a lateral surface, wherein the end faces of each coil core intersect, preferably orthogonally, its first longitudinal axis, wherein the lateral surface has a central region and two outer regions bounding the central region, wherein the cast volume completely bounds the central regions, in each case, in a coil region, wherein the outer regions as well as the end faces are preferably outside of the cast volume;

filling the cast volume by means of a plastic;

allowing the plastic to harden or hardening the plastic;

removing the mold from the plastic casting, wherein the cast volume is continuous.

Especially, the casting method is an injection molding method, wherein the injection molding method can be, for example, a thermoplastic injection molding method or a thermosetting plastic injection molding method.

The plastic comprises, in such case, advantageously, at least one of the following materials: polyetheretherketone (PDEK), polyphenylene sulfide (PPS), polyphthalamide (PPA), polyamide (PA). Especially, the plastic is high temperature resistant.

In an embodiment, the first longitudinal axes of the coil cores coincide, wherein each coil core has an inner end face, which is directed toward the other coil core, wherein the inner end faces define an intermediate region, which is at least partially, especially in a central region, free of plastic casting, wherein in a first plane containing the first longitudinal axes the plastic casting has a recess, which surrounds the intermediate space and defines an open side of the coil holder, wherein in a second plane containing the first longitudinal axes and extending perpendicularly to the first plane, the plastic casting is not continuous.

In a variant, the inner end faces can be covered by the injection molding with plastic, whereby the coil cores have lower production tolerance requirements, which, however, introduces metrological disadvantages, since plastic on the inner end faces means a higher magnetic resistance and, thus, a lessened signal strength.

In an embodiment, the coil holder can be pushed via the open side onto a measuring tube of a magnetic inductive flowmeter, wherein the plastic casting has at least a first engagement means and/or at least a first catch for a second engagement means of the measuring tube, with which first engagement means, or first catch, a shape interlocking connection with the measuring tube is producible.

In an embodiment, the method includes a providing and positioning of a first coil contact as well as a second coil contact, which coil contacts are adapted to connect the coils to a power supply.

The power supply of a magnetic inductive flowmeter is part of an electronic measuring/operating circuit and supplies the coils with a voltage, which typically changes its polarity at regular intervals, this bringing a change of flow direction of a coil current and, thus, a change of a direction of the magnetic field.

In an embodiment, the coil core has in the central region a lesser cross-sectional area than in the outer regions.

In an embodiment, the providing of the coil cores includes production of the coil cores by a metal powder injection molding method, sintering, casting, milling or turning, wherein each coil core is one piece, wherein especially the coil cores are equal building block parts.

A magnetic inductive flowmeter of the invention for measuring flow velocity, or volume flow, of a medium flowing through a measuring tube comprises:

a measuring tube having a measuring tube axis;

a magnet system for producing a magnetic field, which extends perpendicularly to the measuring tube axis, wherein the magnet system includes a coil system with a coil holder as claimed in one of the previous claims as well as two coils, which coils are secured in coil regions of the coil holder;

a pair of measuring electrodes for registering a flow dependent voltage induced by the magnetic field in the medium;

an electronic measuring/operating circuit for operating the magnet system as well as the measuring electrodes and for providing a flow dependent measured variable, wherein the measuring tube has a guide, which is adapted to assure a precise lateral pushing of the coil holder onto the measuring tube.

In an embodiment, the measuring tube includes at least a second engagement means and/or at least a second catch for the first engagement means of the coil holder, by means of which second engagement means, or second catch, a shape interlocking connection with the coil holder is produced.

In an embodiment, the coils are wound around, in each case, a coil core of the coil holder.

In an embodiment, the coil holder includes a first coil contact as well as a second coil contact, which coil contacts are adapted to connect the coils to a power supply, wherein, in each case, a first end of a coil wire is connected with the first coil contact and a second end of the coil wire with the second coil contact in such a manner that by applying a voltage across the coil contacts magnetic fields of equal orientation are producible by means of the coils.

Especially, the first coil and the second coil are wound with a single coil wire. This avoids an otherwise necessary contacting between a first coil wire and a second coil wire, which would have a disturbing influence on the performance of the magnet system.

In an embodiment, the measuring tube is produced by means of an injection molding method. In an embodiment, the coil holder includes an opening for a measuring electrode, or a measuring electrode contact.

In an embodiment, the measuring tube and/or the coil holder are/is produced from at least one of the following materials: polyetheretherketone (PDEK), polyphenylene sulfide (PPS), polyphthalamide (PPA), polyamide (PA).

In an embodiment, each coil core includes an inner pole shoe and an outer pole shoe, wherein the magnetic inductive flowmeter has a field guide-back adapted to lead the magnetic field between the coils and away from the measuring tube, wherein the inner pole shoe is adapted to shape the magnetic field in the measuring tube, and wherein the outer pole shoe is adapted to produce a magnetic connection with the field guide-back.

BRIEF DESCRIPTION OF THE DRAWINGS

The invention will now be described based on examples of embodiments schematically illustrated in the drawing, the figures of which show as follows.

DETAILED DESCRIPTION

Figure 1:
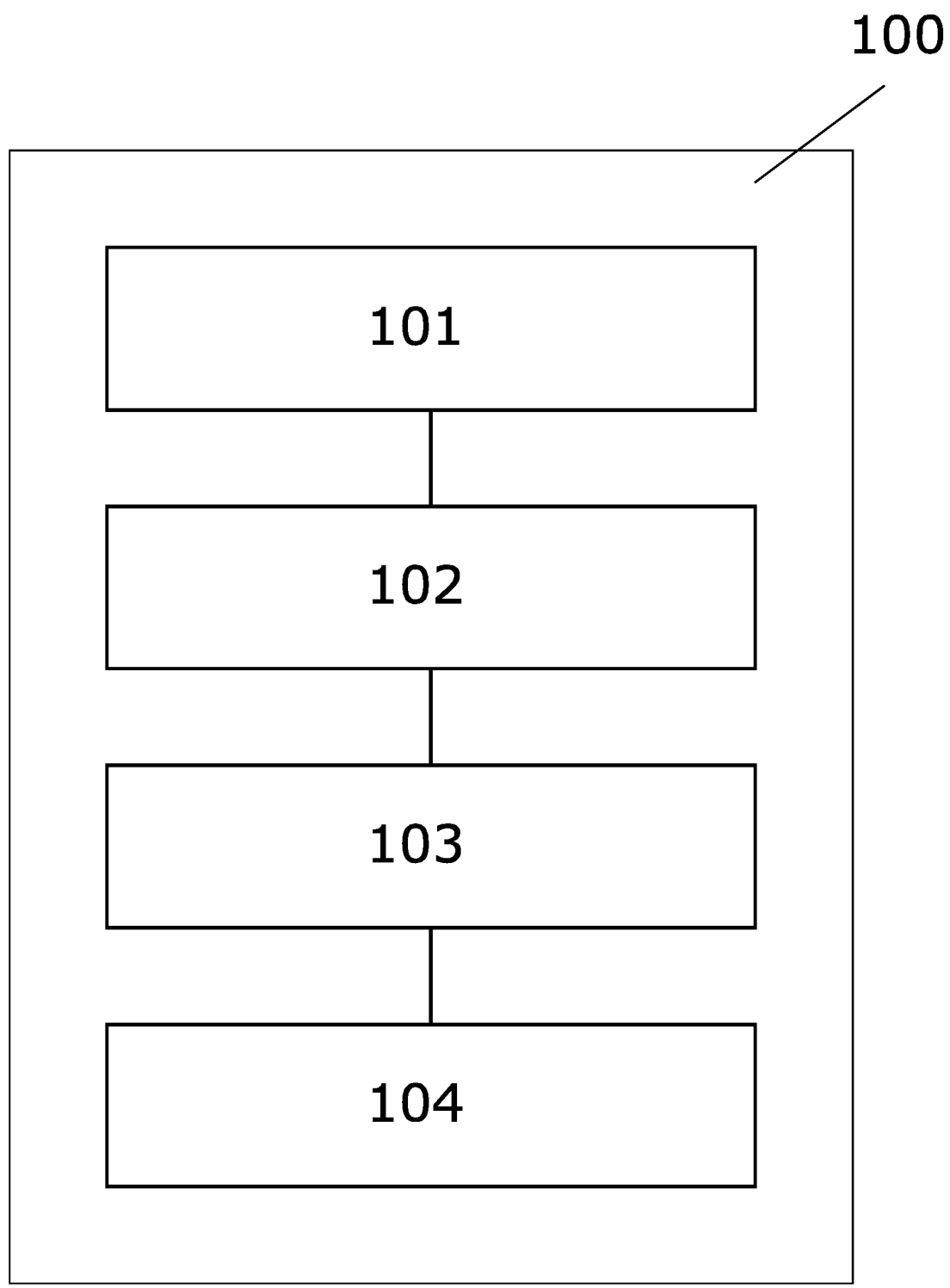
FIG. 1 shows method steps of a variant of a method for producing a coil holder of the present disclosure.

FIG. 1 shows the method steps of a variant of a method 100 for producing a coil holder of the invention for a magnetic inductive flowmeter 1, wherein the method comprises steps as follows:

providing and positioning of a mold with a cast volume as well as the two coil cores in a first method step 101, wherein each coil core has two end faces as well as a lateral surface, wherein the end faces of each coil core preferably orthogonally intersect its first longitudinal axis, wherein the lateral surface has a central region and two outer regions bounding the central region, wherein the cast volume in a coil region completely bounds the central regions, wherein the outer regions as well as the end faces are spaced from the cast volume. The mold can, in such case, comprise a plurality of mold parts, wherein mold parts are brought into position sequentially or simultaneously. It can, for example, be advantageous to position first at least a first mold part, then the coil cores, and then at least a second mold part. In this way, coil cores with complex geometry can be brought into the cast volume.

filling the cast volume by means of a plastic in a second method step 102;

allowing the plastic to harden in a third method step 103;

removing the mold from the plastic casting in a fourth method step 104, wherein the coil cores remain in the plastic casting.

Figure 2:
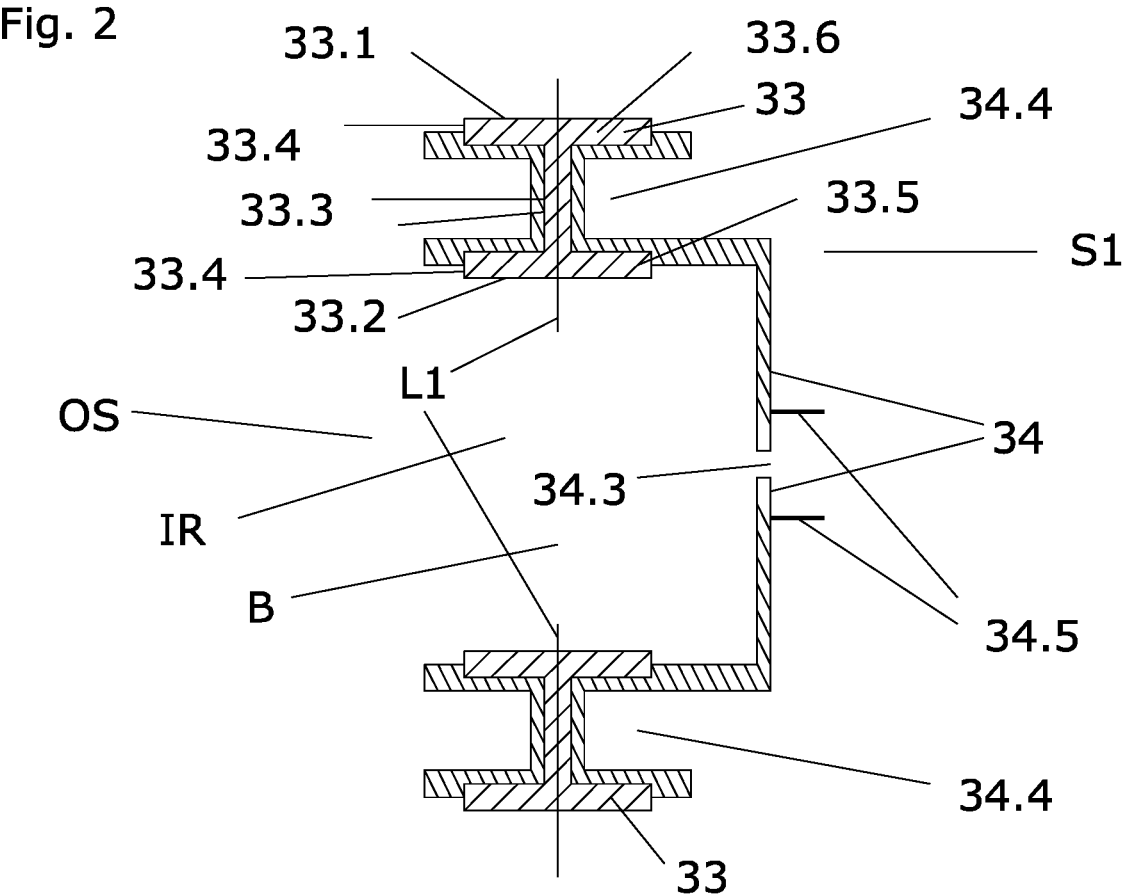
FIG. 2 shows a cross-section of a coil holder of the present disclosure.

FIG. 2 shows a cross-section of a coil holder 34 of the invention, which coil holder has a first coil core 33.7 embedded in the coil holder as well as a second coil core 33.8 embedded in the coil holder with, in each case, a first longitudinal axis L1. The coil cores 33.7, 33.8 have, in each case, an outer end face 33.1 facing away from the other coil core, an inner end face 33.2 facing the other coil core, and a lateral surface. The coil cores are in a central region 33.3 completely bounded by the cast volume and by the plastic casting. The coil cores have outer regions 33.4, each of which bounds an end face 33.1, 33.2, wherein the outer regions as well as the end faces are spaced from the cast volume. The presence of the outer surfaces enables a clean magnetic connecting of a field guide-back 40 of the flowmeter to the coil cores.

The inner end face is part of an inner pole shoe 33.5 of a coil core, which inner pole shoe is adapted to introduce a magnetic field produced by a coil system 31 into a measuring tube 10 of the magnetic inductive flowmeter, and especially to introduce the magnetic field such that it is spatially homogeneous within the measuring tube. The outer end face 33.2 is part of an outer pole shoe 33.6 and is adapted to produce the magnetic connection between the measuring tube 10 and the field guide-back 40 of the magnetic inductive flowmeter, wherein the field guide-back is adapted to lead the magnetic field between coils of the magnetic inductive flowmeter and away from the measuring tube.

An essential aspect of the coil holder is a continuous cast volume, and thus, a continuous plastic casting. In this way, the coil cores have, relative to one another, except for bending movements of the coil holder, a fixed separation from one another.

The coil holder includes an opening 34.3 for a measuring electrode 20, or a measuring electrode contact 21. Furthermore, the coil holder includes two metal coil contacts 34.5, by means of which coils of the magnetic inductive flowmeter 1 can be connected to an electrical power supply, wherein, in each case, a coil is placeable, in each case, in a coil seat 34.4 of the coil holder. The coil seat, in such case, surrounds the central region 33.3 of a coil core, so that upon placing, or winding, of a coil the coil core is surrounded by coil turns.

The inner end faces 33.2 define an intermediate region IR, which is free of plastic casting and which is adapted to accommodate the measuring tube 10 of the flowmeter 1. The intermediate region is, in such case, part of a recess B of the plastic casting, wherein a first plane containing the first longitudinal axes has the recess, wherein the recess surrounds the intermediate space and defines an open side OS of the coil holder, wherein in a second plane containing the first longitudinal axes and perpendicular to the first plane the plastic casting is not continuous. The coil holder 34 can be pushed onto the measurement tube via its open side OS.

Figure 5:
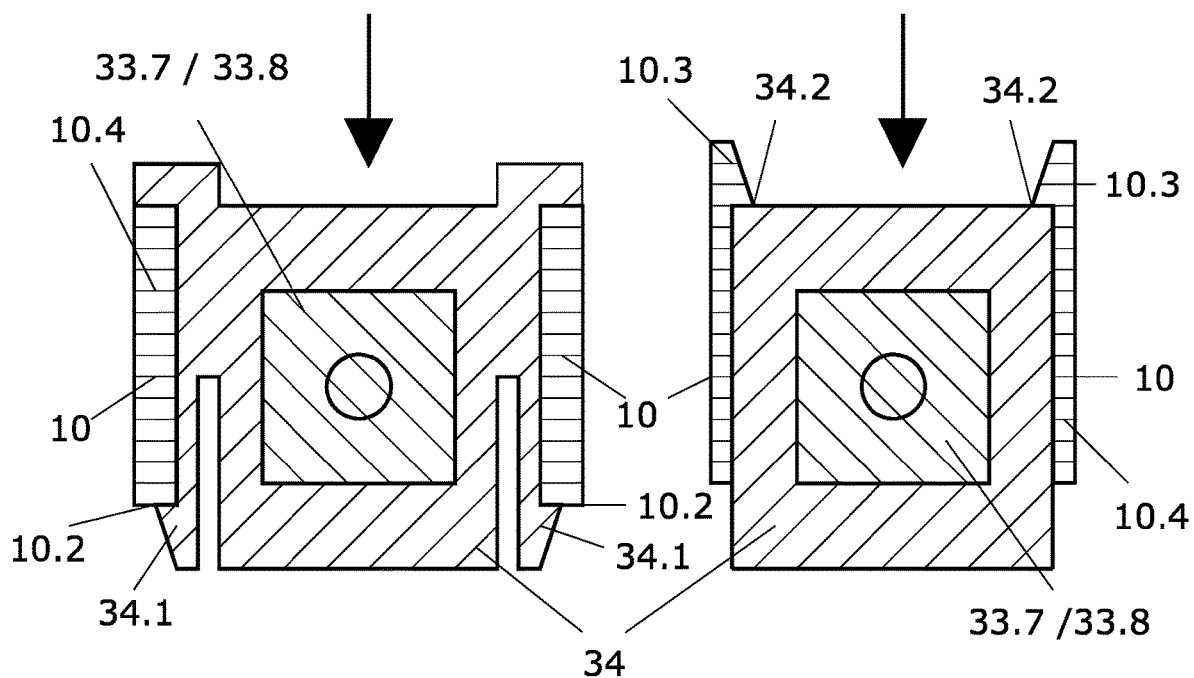
FIGS. 5a and 5b show securement mechanisms for securing the coil holder on the measuring tube.

S1 gives the position of a section shown in FIGS. 5 *a*) and *b*).

Figure 3:
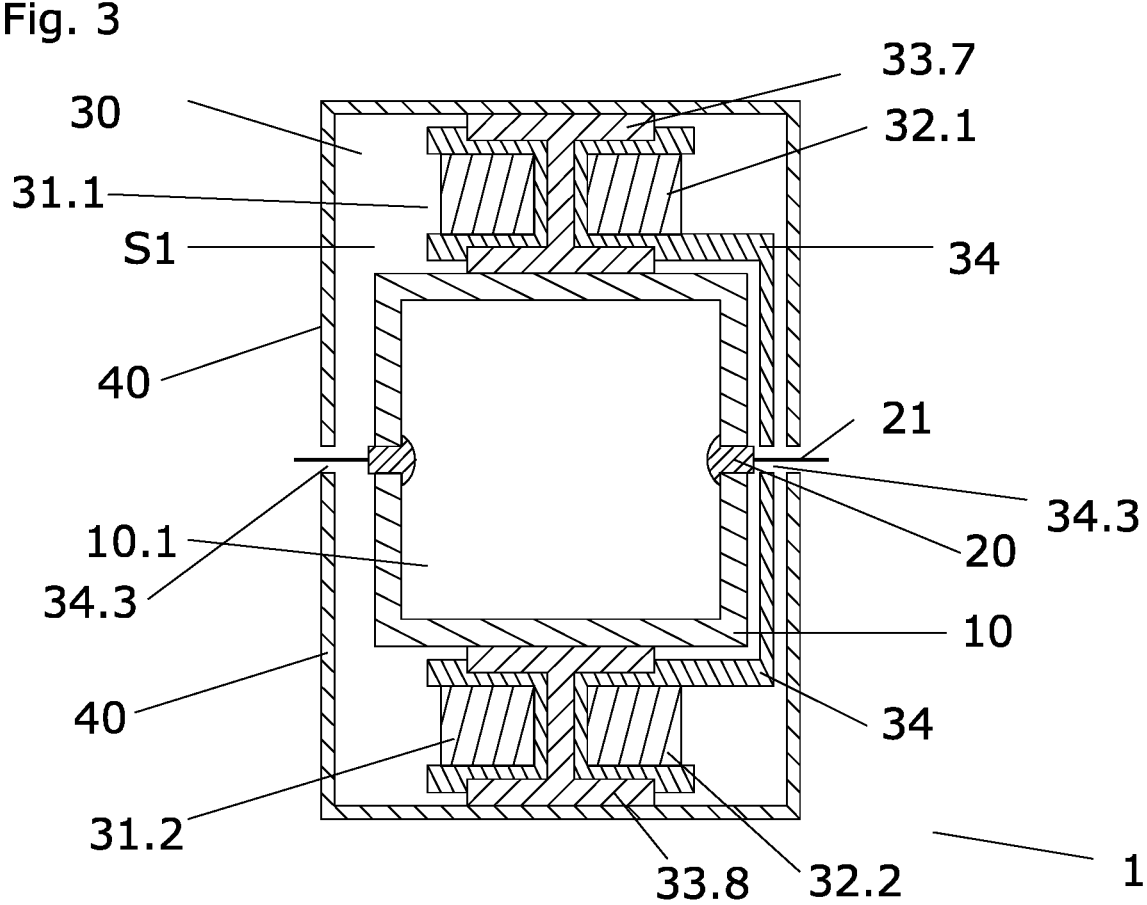
FIG. 3 shows a cross-section of a magnetic inductive flowmeter having a coil holder of the present disclosure.

FIG. 3 shows a cross-section of a flowmeter 1 of the invention, with a measuring tube 10, two measuring electrodes 20 arranged in the measuring tube with, in each case, a measuring electrode contact 21, a coil holder 34 of FIG. 2, a field guide-back 40 and with a first coil 32.1 and a second coil 32.2, which coils are arranged in their coil seats of the coil holder. A conveying lumen 10.1 of the measuring tube for conveying a medium can, such as here, have a rectangular shape in a cross-section of the measuring tube containing the measuring electrodes 20. Alternatively, also round and oval embodiments are possible. The inner pole shoes lie, in such case, against an outside of the measuring tube and assure a transfer of the magnetic field from the measuring tube into the coil core and vice versa. The outer pole shoes connect the field guide-back 40 magnetically to the coil cores. A magnet system 30 of the magnetic inductive flowmeter includes, in such case, a first coil system 31.1 and a second coil system 31.2 with, in each case, a coil 32.1, 32.2 and, in each case, a coil core 33.7, 33.8 integrated in the coil holder. For reasons of perspicuity, the coil contacts shown in FIG. 2 are not shown in FIG. 3. The field guide-backs can have feedthrough openings, through which the coil contacts can pass. S1 gives the position of a section shown in FIGS. 5 *a*) and *b*).

Figure 4:
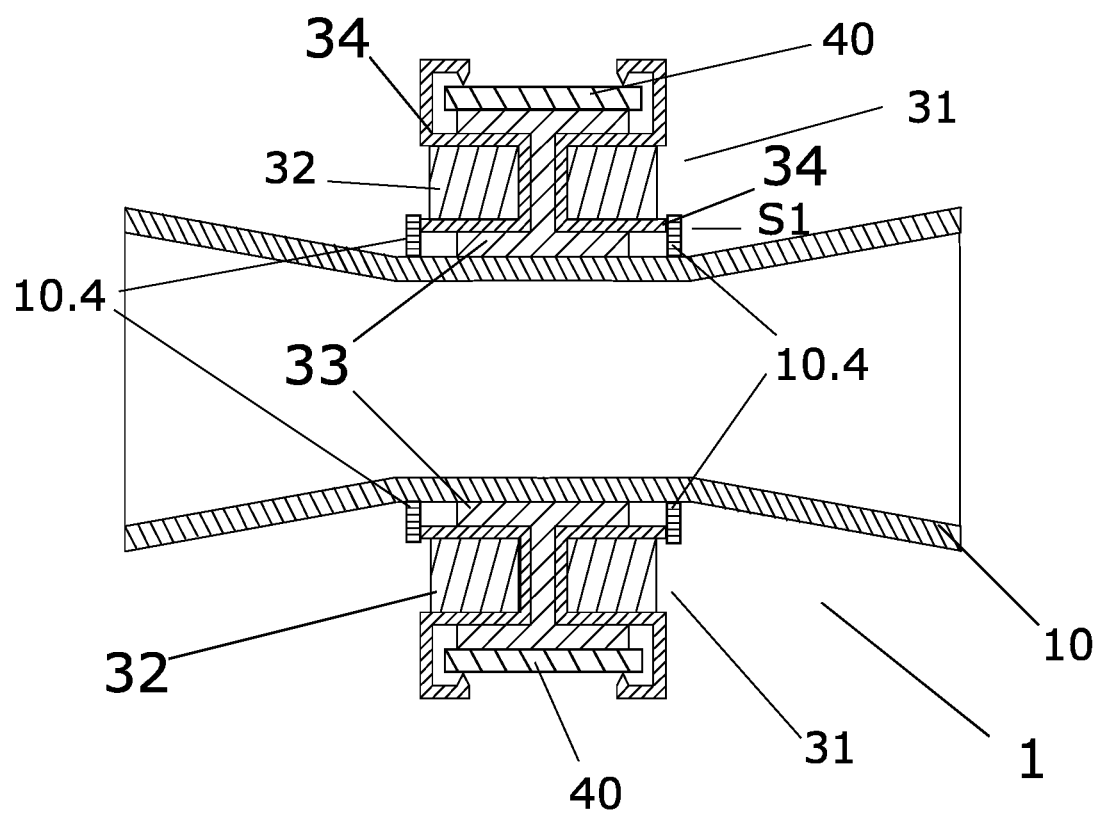
FIG. 4 shows a longitudinal section through the magnetic inductive flowmeter shown in FIG. 3.

FIG. 4 shows a longitudinal section through the flowmeter 1 shown in FIG. 3, wherein the measuring tube 10 has guides 10.4, which assure a precise pushing of the coil holder 34 onto the measuring tube. S1 gives the position of a section shown in FIGS. 5 *a*) and *b*).

FIGS. 5 *a*) and 5 *b*) show sections S1 of different embodiments of a securement mechanism of a magnetic inductive flowmeter of the invention for securing the coil holder 34 on the measuring tube 10, wherein the measuring tube has guides 10.4, by means of which the coil holder 34 can be pushed onto the measuring tube in the direction indicated by the arrow.

In the embodiment illustrated by FIG. 5 *a*), the coil holder 34 includes first engagement means 34.1, which can, such as shown here, be hook shaped detents and after their having passed the guides snap into place and, in each case, hook on a second catch 10.2 of the guide 10.4, so that a movement of the coil holder 34 counter to the push on direction is prevented.

In the embodiment illustrated by FIG. 5 *b*), the coil holder 34 includes a first catch 34.2, in which second engagement means 10.3 of the guide 10.4 of the measuring tube engage and prevent a movement of the coil holder counter to the push on direction.

Figure 6:
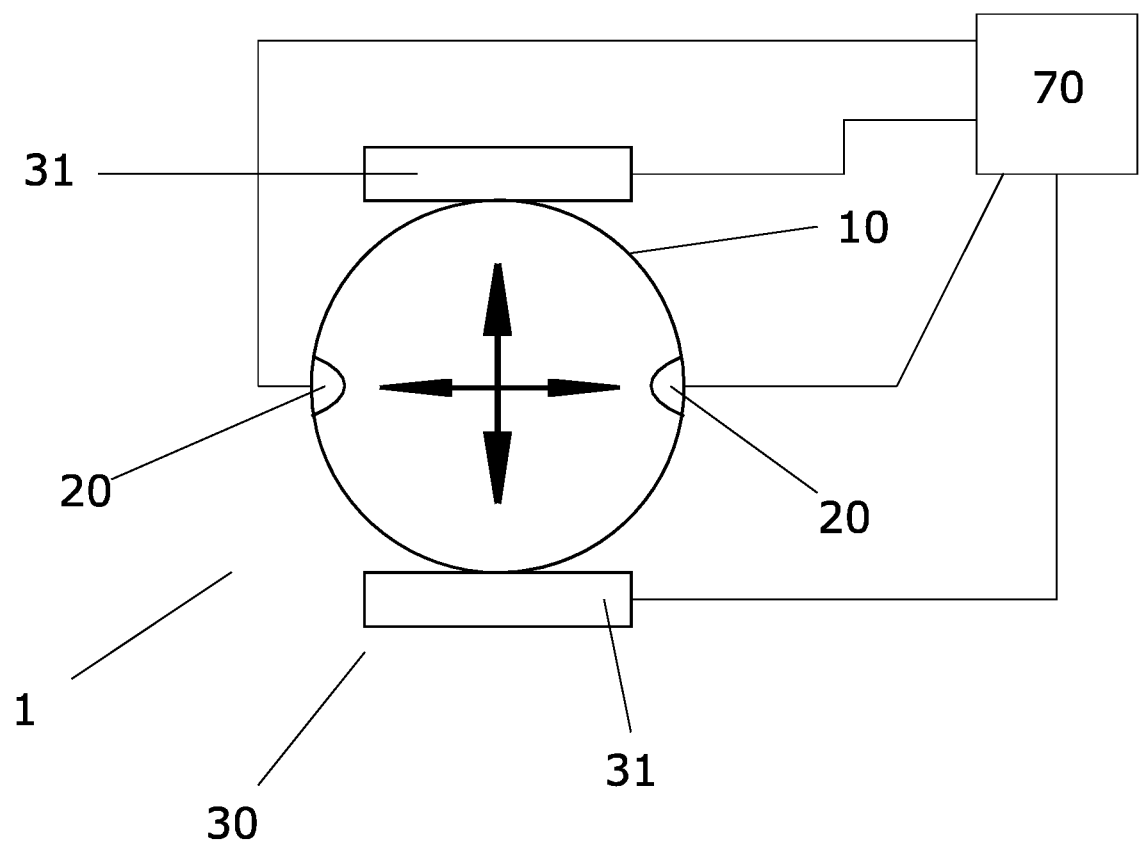
FIG. 6 shows schematically, the operation of an example of a magnetic inductive flowmeter of the present disclosure

FIG. 6 shows the operation of a magnetic inductive flowmeter 1 of the invention based on a simplified representation, which shows the measuring tube 10, in, on or at which are arranged measuring electrodes 20, the magnet system 30 with two coil systems 31, as well as an electronic measuring/operating circuit. The magnet system is adapted to produce a magnetic field extending perpendicularly to a measuring tube axis; see vertical double arrow. The magnetic field induces in medium flowing through the measuring tube a flow dependent electrical voltage (see horizontal double arrow), which is registered by the measuring electrodes and sent to the electronic measuring/operating circuit 70. The electronic measuring/operating circuit is adapted based on the electrical voltage to provide a flow dependent measured variable and to operate the magnet system.

The invention claimed is:

1. A method for producing a coil holder of a magnetic inductive flowmeter, wherein the coil holder includes two coil cores that each have a first longitudinal axis, the method comprising:
   providing a mold defining a cast volume and the two coil cores;
   positioning the two coil cores in the mold, wherein each coil core has two end faces and a lateral surface, wherein each end face of each coil core intersects the respective first longitudinal axis, and wherein each lateral surface includes a central region and two outer regions bounding the central region,
   wherein the cast volume completely bounds each central region in a respective coil region, wherein the outer regions and the end faces are outside of the cast volume;
   filling the cast volume with a plastic material using injection molding as to form the coil holder around the coil cores;
   allowing the plastic to harden or hardening the plastic; and
   removing the mold from the formed coil holder, wherein the cast volume is continuous.

2. The method of claim 1, wherein the first longitudinal axes of the coil cores coincide, wherein each coil core has an inner end face facing the other coil core, wherein the inner end faces define an intermediate region that is at least partially free of the plastic material,
   wherein in a first plane containing the first longitudinal axes the coil holder includes a recess, which at least partially surrounds the intermediate region and defines an open side of the coil holder, and
   wherein in a second plane containing the first longitudinal axes and extending perpendicular to the first plane the plastic material is not continuous.

3. The method of claim 2, wherein the coil holder is configured to be pressed onto a measuring tube of a magnetic inductive flowmeter via the open side, wherein the coil holder includes an engagement feature configured to engage a complementary catch feature of the measuring tube as to form a shape-interlocking connection with the measuring tube.

4. The method of claim 2, wherein the coil holder is configured to be pressed onto a measuring tube of a magnetic inductive flowmeter via the open side, wherein the coil holder includes a catch feature configured to engage a complementary engagement feature of the measuring tube as to form a shape-interlocking connection with the measuring tube.

5. The method of claim 1, further comprising:
   providing a first coil contact and a second coil contact, wherein the first coil contact and the second coil contact are adapted to connect each coil core, respectively, to a power supply; and positioning the first coil contact and the second coil contact in the mold.

6. The method of claim 1, wherein the central region of each coil core has a lesser cross-sectional area than in the outer regions.

7. The method of claim 1, wherein providing the coil cores includes manufacturing the coil cores by metal powder injection molding, sintering, casting, milling or turning, wherein each coil core is one piece, and wherein the coil cores are equal building block parts.

8. A magnetic inductive flowmeter for measuring flow velocity or volume flow of a medium flowing through a measuring tube, the flowmeter comprising:
- a measuring tube having a measuring tube axis;
- a magnet system adapted to generate a magnetic field that extends perpendicular to the measuring tube axis, the magnet system comprising:
  - a first coil system, including a first coil and a first coil core;
  - a second coil core, wherein each of the first coil core and the second coil core includes two end faces and a central region therebetween; and
  - a coil holder, which at least partially surrounds the first coil core and the second coil core, configured such that the first coil core and the second coil core are disposed on opposite sides of the measuring tube, wherein the coil holder completely surrounds each central region of the first coil core and second coil core, respectively, such that the two end faces of each of the first coil core and second coil core extend from the coil holder, and
  - wherein the first coil is wound around a portion of the coil holder in a first coil region surrounding the corresponding central region of the first coil core;
- a pair of measuring electrodes configured to register a flow dependent voltage induced by the magnetic field in the medium; and
- an electronic measuring/operating circuit configured to operate the magnet system and the measuring electrodes and to determine a flow dependent measured variable,
- wherein the measuring tube includes a guide configured to assure a precise lateral installation of the coil holder onto the measuring tube.

9. The magnetic inductive flowmeter of claim 8, further comprising a second coil system that includes a second coil and the second coil core, wherein the first coil system and the second coil system are equally embodied.

10. The magnetic inductive flowmeter of claim 8, wherein the measuring tube includes an engagement feature configured to engage a complementary catch feature of the coil holder as to form a shape-interlocking connection with the coil holder.

11. The magnetic inductive flowmeter of claim 8, wherein the measuring tube includes a catch feature configured to engage a complementary engagement feature of the coil holder as to form a shape-interlocking connection with the coil holder.

12. The magnetic inductive flowmeter of claim 9, wherein the second coil is wound around a portion of the coil holder in a second coil region surrounding the corresponding central region of the second coil core.

13. The magnetic inductive flowmeter of claim 9, wherein the coil holder includes a first coil contact and a second coil contact, wherein the first coil contact and the second coil contact are configured to connect the first coil and second coil, respectively, to a power supply, wherein a first end of a coil wire is connected with the first coil contact and a second end of the coil wire is connected with the second coil contact such that magnetic fields of equal orientation are generated by the first and second coils when a voltage is applied across the first coil contact and second coil contact.

14. The magnetic inductive flowmeter of claim 13, wherein the first and second coil contacts are pressed into blind holes provided therefor.

15. The magnetic inductive flowmeter of claim 8, wherein the measuring tube is manufactured using an injection molding method.

16. The magnetic inductive flowmeter of claim 8, wherein the measuring tube is manufactured of at least one of the following materials: polyetheretherketone (PDEK), polyphenylene sulfide (PPS), polyphthalamide (PPA) and polyamide (PA), and/or
- wherein the coil holder is manufactured of a non-conductive and temperature-resistant plastic.

17. The magnetic inductive flowmeter of claim 8, wherein the coil holder includes an opening configured for a measuring electrode or a measuring electrode contact.

18. The magnetic inductive flowmeter of claim 8, further comprising a field guide-back configured to direct the magnetic field between the first and second coil cores and away from the measuring tube,
- wherein each of the first and second cores includes an inner pole shoe and an outer pole shoe, wherein the inner pole shoe is adapted to shape the magnetic field in the measuring tube, and wherein the outer pole shoe is adapted to produce a magnetic connection with the field guide-back.

\* \* \* \* \*